(12) United States Patent
Hashimoto et al.

(10) Patent No.: US 7,623,418 B2
(45) Date of Patent: Nov. 24, 2009

(54) REPRODUCING APPARATUS HAVING AN OPENING OPERATION

(75) Inventors: Toyohiro Hashimoto, Hirakata (JP); Haruyuki Shimizu, Suita (JP)

(73) Assignees: Sanyo Electric Co., Ltd., Moriguchi (JP); Sanyo Technosound Co., Ltd., Daito (JP)

(*) Notice: Subject to any disclaimer, the term of this patent is extended or adjusted under 35 U.S.C. 154(b) by 434 days.

(21) Appl. No.: 10/547,679

(22) PCT Filed: Mar. 4, 2004

(86) PCT No.: PCT/JP2004/002767

§ 371 (c)(1),
(2), (4) Date: Sep. 2, 2005

(87) PCT Pub. No.: WO2004/079735

PCT Pub. Date: Sep. 16, 2004

(65) Prior Publication Data

US 2006/0227674 A1 Oct. 12, 2006

(30) Foreign Application Priority Data

Mar. 5, 2003 (JP) .............................. 2003-058922

(51) Int. Cl.
*G11B 17/22* (2006.01)
(52) U.S. Cl. .................................. 369/30.32
(58) Field of Classification Search ................ 369/127, 369/44.27, 44.32, 53.2, 30.32
See application file for complete search history.

(56) References Cited

U.S. PATENT DOCUMENTS 5,970,035 A * 10/1999 Ohmori et al. ............. 369/53.2
6,909,675 B2 * 6/2005 Liu .......................... 369/30.15
2001/0008504 A1 * 7/2001 Tanabe et al. ................. 369/32

FOREIGN PATENT DOCUMENTS

| JP | 5-27894 | | 2/1993 |
| JP | 05027894 | * | 2/1993 |
| JP | 5-54507 | | 3/1993 |
| JP | 7-37320 | | 2/1995 |
| JP | 07-037320 | A | 2/1995 |
| JP | 10-233043 | A | 9/1998 |
| JP | 3085946 | | 2/2002 |

OTHER PUBLICATIONS

Translation of the International Preliminary Report on Patentability of International Application No. PCT/JP 2004/002767, with Form PCT/IPEA/409.
Office Action Issued by Japanese Patent Office in 2003-058922, dated Sep. 18, 2008.

* cited by examiner

*Primary Examiner*—Hoa T Nguyen
*Assistant Examiner*—Andrew J Sasinowski
(74) *Attorney, Agent, or Firm*—Westerman, Hattori, Daniels & Adrian, LLP

(57) ABSTRACT

A reproducing apparatus comprises an open key for inputting an open command for causing a loading unit to move a medium holding member from a closed position to an opened position, a setting unit arranged to set the open key press duration, required for the loading unit to perform an opening operation, to the shortest time period or a longer time period than the shortest time period, and a control unit arranged to cause, in a case where the open key is operated, the loading unit to perform the opening operation when the open key press duration reaches the open key press duration set by the setting unit.

4 Claims, 2 Drawing Sheets

REPRODUCING APPARATUS HAVING AN OPENING OPERATION

TECHNICAL FIELD

The present invention relates to a reproducing apparatus such as a DVD player, for example.

BACKGROUND ART

Known as DVD (Digital Versatile Disk) players have been ones comprising a loading device for moving a medium holding member for holding a disk from a closed position where a reproducing operation can be performed to an opened position where a medium is to be mounted and removed. Examples of the loading device are slide-type ones for sliding, when the medium holding member holds the disk in a horizontal state, the medium holding member in a back-and-forth direction and open-close-type ones for causing, when the medium holding member holds the disk in a vertical state, the medium holding member to fall obliquely. When a user presses an open key, an opening operation is performed by the loading device, so that the medium holding member is moved to the opened position.

Some of the DVD players of this type have the function of inhibiting the opening operation (an opening operation inhibiting function) by the loading device in order to prevent the medium holding member from being opened by a child carelessly pressing the open key. The opening operation inhibiting function is set and released by a method of simultaneously pressing a plurality of keys, for example. When the opening operation inhibiting function is set, the medium holding member cannot be opened unless an operation for releasing the opening operation inhibiting function is performed. Therefore, the operation for opening the medium holding member from a state where the opening operation is inhibited is troublesome.

An object of the present invention is to provide a reproducing apparatus capable of restricting an opening operation performed by loading means such that the opening operation is not performed merely by pressing an open key as well as capable of performing the opening operation even by continuing to press the open key for not less than a set time period even when the opening operation is restricted.

DISCLOSURE OF INVENTION

In a reproducing apparatus comprising loading means for moving a medium holding member from a closed position where a reproducing operation can be performed to an opened position where a medium is to be mounted and removed, the reproducing apparatus according to the present invention is characterized by comprising an open key for inputting an open command for causing the loading means to move the medium holding member from the closed position to the opened position; setting means for setting the open key press duration, required for the loading means to perform an opening operation, to the shortest time period or a longer time period than the shortest time period; and control means for causing, in a case where the open key is operated, the loading means to perform the opening operation when the open key press duration reaches the open key press duration set by the setting means.

It is preferable that there is provided means for causing, in a case where the setting means sets the longer time period than the shortest time period as the open key press duration, a display device to indicate that the opening operation performed by the loading means is restricted.

According to the present invention, the opening operation performed by the loading means can be restricted such that the opening operation is not performed merely by pressing the open key, and the opening operation can be performed by continuing to press the open key for not less than a set time period even when the opening operation is restricted.

BEST MODE FOR CARRYING OUT THE INVENTION

Figure 1:
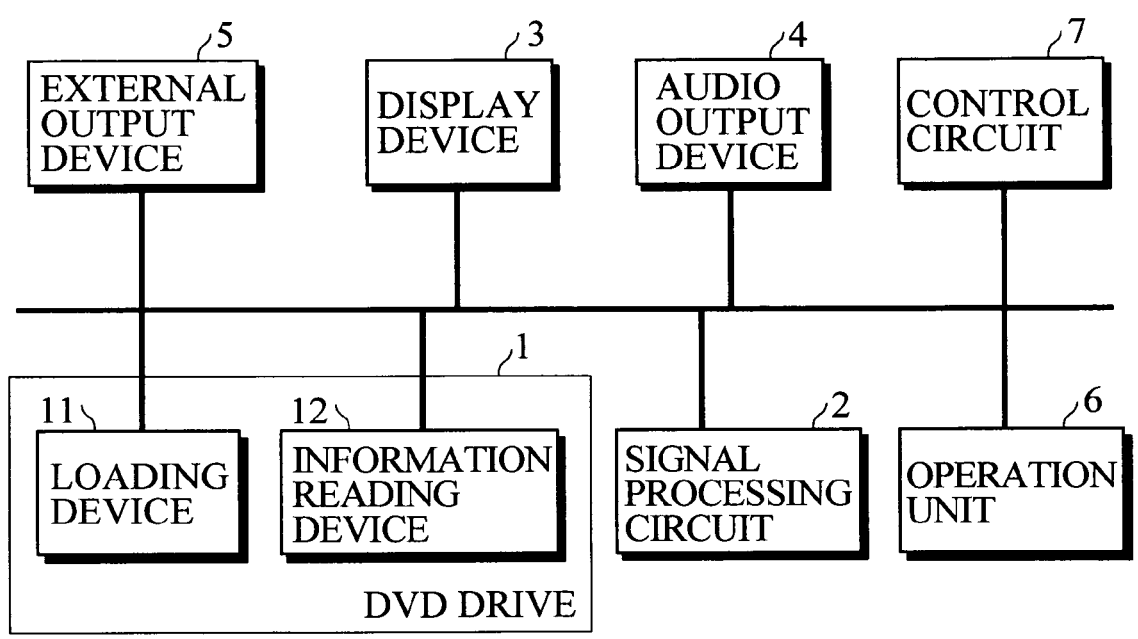
FIG. 1 is a block diagram showing the electrical configuration of a DVD player.

Referring now to the drawings, an embodiment in a case where the present invention is applied to a DVD player will be described.

FIG. 1 illustrates the electrical configuration of a DVD player.

In FIG. 1, reference numeral 1 denotes a DVD drive, reference numeral 2 denotes a signal processing circuit, reference numeral 3 denotes a display device, reference numeral 4 denotes an audio output device, reference numeral 5 denotes an external output device, reference numeral 6 denotes an operation unit, and reference numeral 7 denotes a control circuit. The DVD drive 1 comprises a loading device 11 for moving a disk holding member (medium holding member) from a closed position where a reproducing operation can be performed to an opened position where a medium is to be mounted and removed, and an information reading device 12 for reading information such as video, audio, and others from a disk.

A signal read by the information reading device 12 is outputted to the display device 3, the audio output device 4, and the external output device 5 through the signal processing circuit 2. The control circuit 7 is composed of a system controller using a microcomputer and controls the whole of a system on the basis of an operation signal from the operation unit 6. The operation unit 6 is provided with a plurality of keys including an open key.

In the DVD player, the disk holding member is generally moved from the closed position to the opened position by merely pressing the open key. In the present embodiment, the movement of the disk holding member from the opened position to the closed position is performed manually. The movement of the disk holding member from the opened position to the closed position may be also performed automatically on the basis of a key operation.

In the DVD player, the duration of the press of the open key (hereinafter referred to as open key press duration) required for the loading device 11 to perform an opening operation can be set on a menu screen displayed on the display device 3 by operating the operation unit 6. In this example, the open key press duration required for the loading device 11 to perform the opening operation can be set to the shortest time period at the normal time or a longer time period than the shortest time period. As the time period longer than the shortest time period, a plurality of types of time periods can be set from 3 to 10 seconds, for example. In a case where the shortest time period is set, it is considered that the open key press duration reaches the shortest time period if key entry from the open key is made.

In the following description, a mode in which the shortest time period is set as the open key press duration required for the loading device 11 to perform the opening operation is referred to as an opening operation non-restricted mode, and a mode in which the time period longer than the shortest time period is set is referred to as an opening operation restricted mode.

Figure 2:
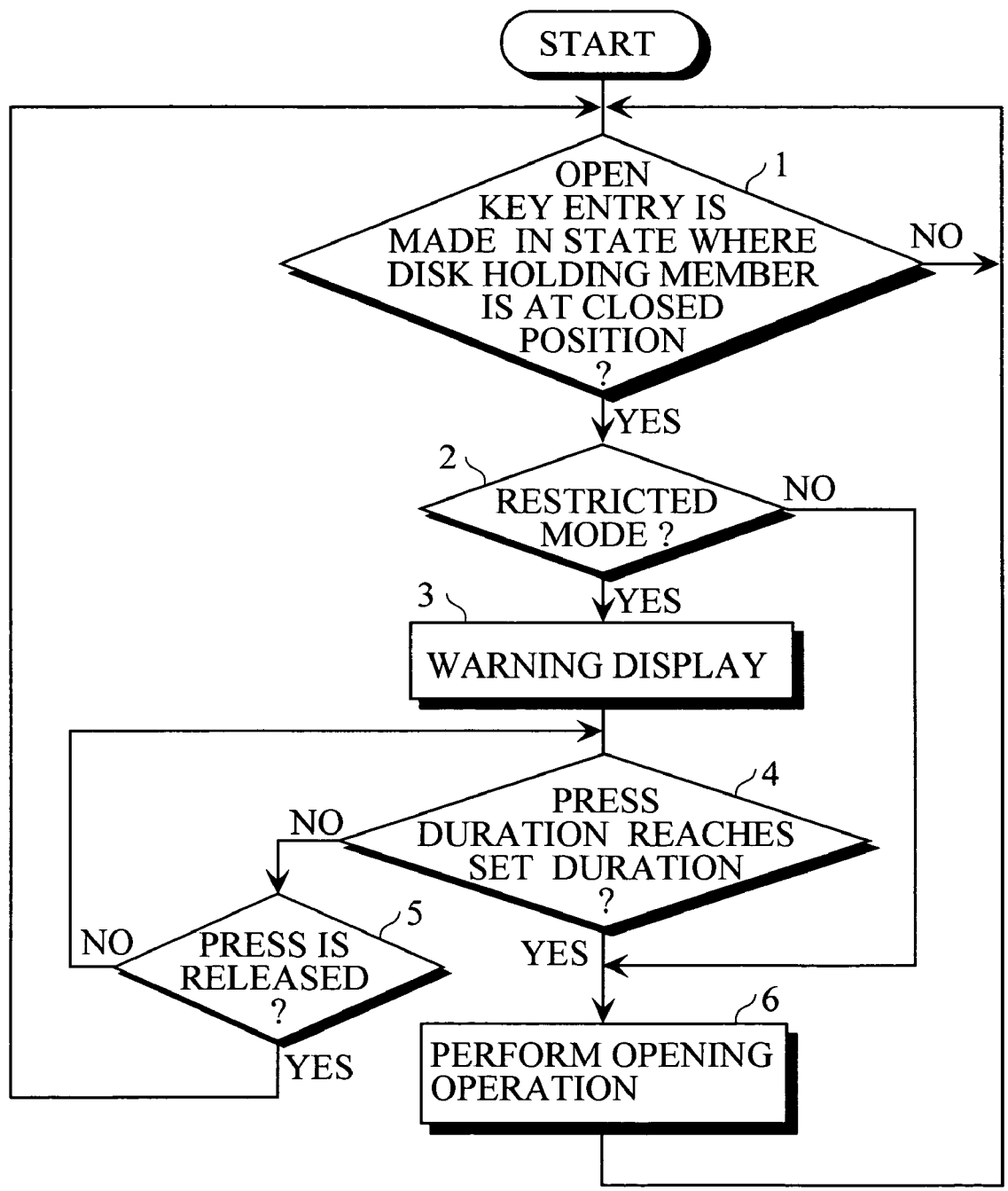
FIG. 2 is a flow chart showing the procedure for control processing of a loading device by a control circuit in a case where an open key is pressed in a state where a disk holding member is at a closed position.

FIG. 2 shows the procedure for control processing of the loading device 11 by the control circuit 7 in a case where the open key is pressed in a state where the disk holding member is at the closed position.

When an open key signal is inputted by the press of the open key in a state where the disk holding member is at the closed position (step 1), a distinction between the opening operation non-restricted mode and the opening operation restricted mode is made (step 2). At the time of the opening operation restricted mode, the display device 3 indicates (warning display) that the opening operation is restricted (step 3), and it is repeatedly judged whether or not the open key press duration reaches the duration currently set (step 4) or whether or not the press of the open key is released.

When the open key press duration reaches the duration currently set (YES in step 4), the disk holding member is moved to the opened position by the loading device 11 (step 6). The procedure is returned to the step 1.

In a case where the press of the open key is released before the open key press duration reaches the duration currently set (No in step 4, and YES in step 5), the procedure is returned to the step 1.

At the time of the opening operation non-restricted mode in the foregoing step 2, the disk holding member is moved to the opened position by the loading device 11 (step 6). The procedure is returned to the step 1.

According to the foregoing embodiment, the opening operation performed by the loading device can be restricted such that the opening operation is not performed merely by pressing the open key, and the opening operation can be performed by continuing to press the open key for not less than a set time period even in a case where the opening operation is restricted (at the time of the opening operation restricted mode).

In a case where the open key is pressed at the time of the opening operation restricted mode, the opening operation is not immediately performed. However, the display device 3 indicates that the opening operation is restricted. Even if a person who has operated the open key is a person who does not understand the opening operation restricting function, therefore, the person is prevented from mistaking the device for being at fault.

The present invention is also applicable to reproducing apparatuses such as an MD (Mini Disc) player, a CD (Compact Disc) player, and a VTR (Video Tape Recorder).

The invention claimed is:

1. In a reproducing apparatus comprising a loading unit arranged to move a medium holding member from a closed position where a reproducing operation can be performed to an opened position where a medium is to be mounted and removed, the reproducing apparatus comprising:
an open key for inputting an open command for causing the loading unit to move the medium holding member from the closed position to the opened position;
a setting unit arranged to allow a user to set the open key press duration, required for the loading unit to perform an opening operation, to the shortest time period or a longer time period than the shortest time period; and
a control unit arranged to cause, in a case where the open key is operated, the loading unit to perform the opening operation when the open key press duration reaches the open key press duration set by the setting unit,
wherein the user is a human operator,
said reproducing apparatus further comprising:
a unit arranged to cause, in a case where the setting unit sets the longer time period than the shortest time period as the open key press duration, a display device to indicate that the opening operation performed by the loading unit is restricted only when the open key is pressed down.

2. The reproducing apparatus according to claim 1, wherein the shortest time period is 3 seconds and the longest time period is 10 seconds.

3. The reproducing apparatus according to claim 1, wherein the open key press duration set by the setting unit is selected on a menu screen displayed on the display device.

4. The reproducing apparatus according to claim 3, wherein the reproducing apparatus is a Digital Versatile Disc (DVD) player, a Mini Disc (MD) player, a Compact Disc (CD) player, or Video Tape Recorder (VTR).

* * * * *